United States Patent
Geltinger et al.

(10) Patent No.: US 8,741,205 B2
(45) Date of Patent: Jun. 3, 2014

(54) APPARATUS AND PLANT FOR THE STRETCH BLOW MOULDING OF PLASTICS MATERIAL PRE-FORMS AND USE OF A CERAMIC COMPONENT

(75) Inventors: Florian Geltinger, Donaustauf (DE); Michael Neubauer, Regensburg (DE)

(73) Assignee: Krones AG, Neutraubling (DE)

( * ) Notice: Subject to any disclaimer, the term of this patent is extended or adjusted under 35 U.S.C. 154(b) by 45 days.

(21) Appl. No.: 13/485,950

(22) Filed: Jun. 1, 2012

(65) Prior Publication Data

US 2012/0306127 A1   Dec. 6, 2012

(30) Foreign Application Priority Data

Jun. 3, 2011 (DE) .................. 10 2011 104 316

(51) Int. Cl.
*B29C 49/56* (2006.01)
*B29C 49/42* (2006.01)

(52) U.S. Cl.
USPC .............. 264/523; 425/73; 425/522; 425/541

(58) Field of Classification Search
USPC ............................ 425/73, 522, 541; 264/523
See application file for complete search history.

(56) References Cited

U.S. PATENT DOCUMENTS

| 5,762,981 | A * | 6/1998 | Nitsche | 425/522 |
| 6,428,302 | B1 * | 8/2002 | Tsau | 425/192 R |
| 7,025,584 | B2 * | 4/2006 | Tsau | 425/526 |
| 2006/0078643 | A1 * | 4/2006 | Mitchell et al. | 425/541 |
| 2010/0272844 | A1 * | 10/2010 | Dordoni | 425/210 |
| 2011/0104324 | A1 * | 5/2011 | Langlois | 425/522 |
| 2011/0129558 | A1 * | 6/2011 | Langlois | 425/182 |

FOREIGN PATENT DOCUMENTS

| EP | 1535719 A1 | 6/2005 |
| WO | WO 2009156698 A2 * | 12/2009 |
| WO | WO 2009156699 A2 * | 12/2009 |

OTHER PUBLICATIONS

Syed Rizvi, Ph.D., A Comprehensive Review of Lubricant Chemistry, Technology, Selection, and Design, pp. 172-181, ASTM International, Mar. 2009, Baltimore, Md.*
English abstract for EP 1535719 A1, dated Jun. 2005.
SKF: Composite Gleitlager—Wartungsfrei und platzparend. Druckschrift 6110. Schweden—date: 2006.
German search report dated Apr. 11, 2012 in application No. DE 10 2011 104 316.4.

* cited by examiner

*Primary Examiner* — Robert B Davis
(74) *Attorney, Agent, or Firm* — Oppedahl Patent Law Firm LLC

(57) ABSTRACT

The invention relates to an apparatus (1) for the stretch blow molding of plastics material pre-forms to form plastics material containers with a carrying device (2) for carrying a blow mold (3) comprising at least two shell parts (4, 5) and a base part (6) and with a base part clamping device (10) comprising a base part receiving means (11; 111) and holding devices (12, 13 and 14, 15; 114, 115 respectively) for holding the base part receiving means (11; 111), in which the base part receiving means (11; 111) is capable of being clamped to the holding devices (12, 13 and 14, 15; 114, 115 respectively) by way of a fastening with positive locking (18; 118), in which the fastening with positive locking (18; 118) has positive locking areas (22) produced from ceramic material.

15 Claims, 2 Drawing Sheets

APPARATUS AND PLANT FOR THE STRETCH BLOW MOULDING OF PLASTICS MATERIAL PRE-FORMS AND USE OF A CERAMIC COMPONENT

The invention relates to an apparatus for the blow molding, and in particular for the stretch blow molding, of plastics material pre-forms into plastics material containers with a carrying device for carrying a blow mold comprising at least two shell parts and a base part and with a base part clamping device comprising a base part receiving means and holding devices for holding the base part receiving means, in which the base part receiving means is capable of being clamped to the holding devices by way of a fastening with positive locking. The holding devices can preferably be designed in the form of an additional part fastened to the shell parts—in order to be capable of being easily replaced on account of wear—or, on the other hand, in the form of a part of the shell parts.

In addition, the invention relates to a plant for the shaping, and in particular for the stretch blow molding, of plastics material pre-forms into plastics material containers, with a clean room and with at least one blow molding station comprising a blow mold for imparting the shape to the plastics material pre-forms.

The invention likewise relates to the use of a ceramic component and/or a functional component coated at least in part with a ceramic material.

Generic stretch blow molding apparatus exist in numerous variations, and, in particular, drinks bottles of plastics materials can be satisfactorily produced from them. To this end a plastics material pre-form is inserted into a blow mold and is expanded by means of a process pressure to form the actual plastics material container into which a beverage can then be poured and stored. In order that the plastics material container shaped in the blow mold by the expansion of the plastics material pre-form can also be removed from this mold, the actual blow mold usually has a plurality of parts capable of being separated from one another, namely two lateral shell parts and a base part capable of being clamped thereon.

In their entirety the two lateral shell parts and the base part form with their internal contour the negative shape of the plastics material container to be produced. During the expansion of the plastics material pre-form relatively high pressing forces occur which, in particular, also act upon the base part and which press the latter downwards. Whilst pressing forces acting radially upon the two shell parts are absorbed by a carrying device for carrying the two shell parts, pressing forces acting axially upon the base part must likewise be introduced into the carrying device or into a base part clamping device.

To this end the carrying device or the base part clamping device respectively comprises a corresponding base part holding means. On account of the pressing forces acting axially, the base part holding means should not be deformed nor should the base part raise itself off from the shell parts, since otherwise a gap can be formed in the mold between the shell parts and the base part and this will be subsequently evident as an unsightly impression on the plastics material container. In particular, for this reason, the base part receiving means is ideally supported on holding shells of the base part clamping device by way of a fastening with positive locking.

At the same time the base part can be centred with respect to the two shell parts by means of the fastening with positive locking. In order to be able to meet the most highly demanding requirements in terms of hygiene standards during the production of the plastics material containers, both a blow molding process of the plastics material containers and a subsequent filling process are frequently carried out in clean rooms. The problem arises in particular in this context that the components—the base part receiving means and the holding shells—frequently have to be provided with a lubricant during the formation of the fastening with positive locking. Lubricants are undesired, in particular in tasks which are highly demanding in terms of hygiene, in particular in clean rooms, on account of their action which encourages the formation of germs. For this reason, it has long been desired to minimize the use of a lubricant or ideally to dispense with it altogether.

By way of example, a multiple-part blow mold of a blow molding machine for plastics material pre-forms is known from WO 2009/156698 A2, in which a base part receiving means of the blow mold can be fixed in a positively locking manner with respect to lateral shells of the blow mold by clamping device components capable of being pivoted laterally onto the base part. In order to be able to render the use of a lubricant superfluous with respect to a fastening with positive locking between the clamping device components and the base part to be fixed, the positively locking components directly corresponding to one another are coated with a composite plastics material. This is achieved structurally in that the base part is coated on its periphery on the one hand and the clamping device components are coated with a composite plastics material on the other hand, so that essentially only the composite plastics materials are in operative contact. As a result, positively locking components with sufficiently good sliding properties can be produced, so that it is possible to dispense with a lubricant. Composite plastics materials, however, are subject in particular to increased wear as compared with conventional steel components.

In this respect it is an object of the invention to achieve an approximately conventional stability of a known steel fastening with positive locking at the same time as sufficiently good sliding properties but without additional lubricants.

The object of the invention is attained by an apparatus for the shaping, and in particular for the stretch blow molding, of plastics material pre-forms to form plastics material containers with a carrying device for carrying a blow mold comprising at least two shell parts and a base part and with a base part clamping device comprising a base part receiving means and holding devices for holding the base part receiving means, in which the base part receiving means is capable of being clamped to the holding devices by way of a fastening with positive locking, the fastening with positive locking having positive locking areas produced from ceramic material.

According to the invention a ceramic material is used for forming the fastening with positive locking, as a result of which, at the same time as ensuring a very high degree of stability, substantially better sliding properties can nevertheless be achieved in an advantageous manner on mutually corresponding or on mutually engaging positively locking components than is the case with known fastenings with positive locking on blow molds. In particular, a ceramic material is characterized by substantially more wear-resistant properties and has a very low thermal expansion behaviour, as a result of which the present fastening with positive locking stands out even more clearly from the prior art named in the introduction. In this respect the fastening with positive locking is extremely wear-resistant and, on account of the good sliding property, requires no additional lubrication.

In the sense of the invention ceramic composite materials are also considered to be a ceramic material.

In the present case it is particularly advantageous for the positive locking ceramic areas to remain on the apparatus in the event for example that the fittings are changed, as is the case for example when different blow molds are changed. As a result, the number of the ceramic components required, as explained in greater detail below, can be kept small, as a result of which the costs can be reduced once more.

In this respect it is extremely advantageous for the positive locking ceramic areas or the respective components to be arranged in an interchangeable manner directly or indirectly—for example by way of suitable flange fastenings—on the carrying device for carrying the blow mold. In this way, in the event that the fittings are changed they can remain permanently on the present apparatus and can be further used advantageously with respect to another blow mold. They need to be replaced only in the event of critical wear.

The present apparatus according to the invention can be further developed particularly advantageously with respect to the prior art solely by these last-named features, since they make a substantial contribution to the fact that it is possible for a ceramic material to be able to be used more economically with respect to the present fastening with positive locking.

In addition, the object of the present invention is attained by the use of a ceramic component and/or a functional component coated at least in part with a ceramic material as a lubricant replacement on a fastening with positive locking of the stretch blow molding apparatus in a clean room. According to the invention, by means of a component of this type it is possible to dispense with an additional lubricant in a clean room of the stretch blow molding plant for the production of drinks bottles with demanding requirements in terms of hygiene.

In order to be able to make the present stretch blow molding apparatus particularly compact structurally, it is particularly advantageous for the fastening with positive locking to comprise an attachment device for supplying a tempering medium. By way of example, a base part receiving means forming or comprising the fastening with positive locking is provided with an attachment device of this type, in which case the base part receiving means is preferably produced completely in the form of a ceramic component or a group of ceramic components.

In order to be able to hold or clamp the base part receiving means, which is preferably designed in the form of a plate, in a satisfactory manner with the holding devices of the base part clamping device, the aforesaid holding devices preferably comprise corresponding holding shells.

The present fastening with positive locking can be designed in numerous ways. Particularly successful in the field of blow molds have been fastenings with clamping elements which co-operate in a manner overlapping radially and by means of which, in particular, applications of main forces acting axially upon the base part receiving means can be absorbed, without the clamping elements which co-operate in a manner overlapping radially slipping with respect to one another in a critical manner. In this case it is already sufficient for a clamping element in the manner of a web to project radially to behind a corresponding undercutting. By way of example a spring-and-groove fastening with positive locking is described in greater detail in this respect.

For this reason it is advantageous for the present fastening with positive locking to comprise a spring-and-groove device in which a spring and/or a groove of the base part clamping device is or are produced at least in part from ceramic material. Spring-and-groove devices are highly robust and are also characterized by their simplicity.

Since the spring and the groove mainly co-operate in a spring-and-groove fastening, it is advantageous for them to consist at least in part of a ceramic material, in particular in the region of sliding faces in this respect.

In order to achieve, in particular, a satisfactory centring of the base part receiving means with respect to the holding shells, it is advantageous for the components corresponding to one another with respect to the fastening with positive locking, in particular the spring and the groove of the spring-and-groove device, to have a prismatic contour.

In the sense of the invention the term "spring-and-groove device" describes any fastening device in which a fastening with positive locking can be produced between mutually corresponding components by means of at least one web which engages in at least one undercutting of the recess.

In this case it is possible for the groove to be arranged on the base part receiving means and the spring on the holding device. The reverse arrangement, however, would also be possible.

The present base part clamping device can be made in one piece with a carrying device for carrying and actuating the shell parts of the blow mold. It is preferable for the base part clamping device also to be capable of being arranged as a separate component on the carrying device.

If a spring of the base part clamping device has at least one ceramic base body which is—preferably—mounted—in particular—in an interchangeable manner as an insert part on the base part clamping device, the spring can if necessary be replaced rapidly and without difficulty. In this respect, maintenance and/or repair operations can also advantageously be carried out.

If a groove of the base part clamping device has, in a cumulative or alternative manner, at least one ceramic base body which—in particular—is mounted—preferably in an interchangeable manner—as an insert part on the base part clamping device, the advantages achieved for the spring can also be achieved with respect to the groove.

In an advantageous manner the remaining components or groups of components of the base part clamping device can be produced from steel in this case, as is conventional practice.

A further advantageous embodiment variant provides that the base part receiving means and/or the holding devices or the holding shells respectively are formed completely from ceramic material. This embodiment variant has the advantage of simple producibility, since in this case it is not absolutely necessary for ceramic/metal composite components to be produced.

By way of example, only the holding shells are produced completely from ceramic material, whilst the base part receiving means is still produced from steel in an advantageous manner, so that the base part receiving means can be of a conventional type, or vice versa.

In accordance with a further aspect of the invention the present object is also attained by an apparatus for the stretch blow molding of plastics material pre-forms into plastics material containers with a carrying device for carrying a blow mold comprising at least two shell parts and a base part and with a base part clamping device comprising a base part receiving means and holding devices for holding the base part receiving means, in which the base part receiving means is capable of being clamped to the holding devices by way of a fastening with positive locking, the stretch blow molding apparatus being characterized in that the base part clamping device comprises a base part receiving means and holding devices or holding shells respectively for holding the base part receiving means, in which both the base part receiving means and the holding devices or holding shells respectively have in each case at least one groove, which grooves correspond to one another by means of at least one sliding block in such a way that the base part receiving means and the holding devices or holding shells respectively are connected to one another in a positively locking manner, it being advantageous for the sliding block to be produced from a material which is different from the material of the base part receiving means and the holding devices or holding shells respectively.

This solution is characterized in particular by its extremely simple design by which it is possible, in particular, to implement a ceramic fastening with positive locking with a very small number of ceramic components on a blow mold. As a result, a simple retrofitting of existing blow molds is also possible without difficulty.

In this respect it is advantageous for the sliding block to have a ceramic base body.

If a base part receiving means of the base part clamping device is provided radially on the outside with an undercutting with at least two grooves, the grooves being arranged separately from each other in the peripheral direction of the base part receiving means by recesses in the material which extend radially further towards the inside than the undercutting, then sliding blocks can be fixed particularly satisfactorily inside the grooves and prevented from shifting in an undesired manner in the peripheral direction.

In order to be able to seal off fastening area, in particular between the base part of the blow mold and the base part receiving means of the base part clamping device, in a satisfactory manner in terms of hygiene, it is advantageous for the base part receiving means to be sealed off from the base part by means of at least one O-ring seal. As a result, the danger of an hygienic risk can be further reduced.

A particularly preferred embodiment variant provides that the stretch blow molding apparatus is arranged in a clean room of a plant for the stretch blow molding of plastics material pre-forms. Arranging the present stretch blow molding apparatus in a clean room is particularly expedient since the use of lubricants in the clean room has to be regarded as being highly critical from the point of view of hygiene. By means of the stretch blow molding apparatus according to the invention, however, it is possible to dispense with the use of lubricants of this type for lubricating the fastening with positive locking. Such an aseptic design of a blow molding machine is known from WO 2010/020529 A2 of the present Applicants. The contents of the disclosure of this publication are hereby made the contents of the disclosure of the present application by reference in its entirety. It is advantageous for the sterile room to be designed in the manner of a duct around the conveying path of the blow molding station. It is also advantageous for regions of a carrier on which the blow mold parts are arranged to be arranged outside the preferred clean room.

In addition, the object of the invention is also attained by a plant for the stretch blow molding of plastics material pre-forms into plastics material containers with a clean room and with at least one blow molding station comprising a blow mold for shaping the plastics material pre-forms, the stretch blow molding plant being characterized by a stretch blow molding apparatus according to any one of the features described here. It is advantageous for the plant to have a plurality of blow molding apparatus and, in particular, stretch blow molding apparatus of the type described above.

In particular, the difficulty of using lubricants in the clean room and on the blow mold can be confronted in a structurally particularly simple and inexpensive manner in this way.

Fixing all the aforesaid components, in particular the base part receiving means and the holding shells, should ideally be carried out in a microbiologically faultless manner on the stretch blow molding apparatus, preferably by means of a screw fastening. This has the advantage, in particular, that these components can be easily replaced in the event of wear or a fault. In addition, they are simple to sterilize.

To summarize, it may be stated that, with respect to the use of a ceramic material, in particular the following embodiment variants are particularly advantageous, namely firstly that, specifically, releasable insert parts of a ceramic material are capable of being fastened in the holding shells and the remaining components are produced from steel. Secondly, the releasable insert parts can alternatively be fastened in the base part receiving means and the remaining components are produced from steel. Thirdly, the holding shells can consist completely of a ceramic material, and fourthly the base part receiving means can consist in a cumulative or alternative manner of a ceramic material.

A particular advantage of the invention as compared with the prior art is that the ceramic material is not present in or on a replacement part, such as for example the blow mold, base part etc., but on a part which even when the fittings are changed remains in the blow molding station, preferably on the base part clamping device.

Further advantages, aims and properties of the present invention are explained with reference to the accompanying drawing and the following description, in which a stretch blow molding apparatus according to the invention with the base part clamping devices designed in different ways is illustrated and described by way of example. In the drawing FIG. 1 is a diagrammatic view of a stretch blow molding apparatus with a partially opened blow mold comprising at least two shell parts and a base part and with a carrying device comprising a base part clamping device with a base part receiving means and holding shells;

Figure 1:
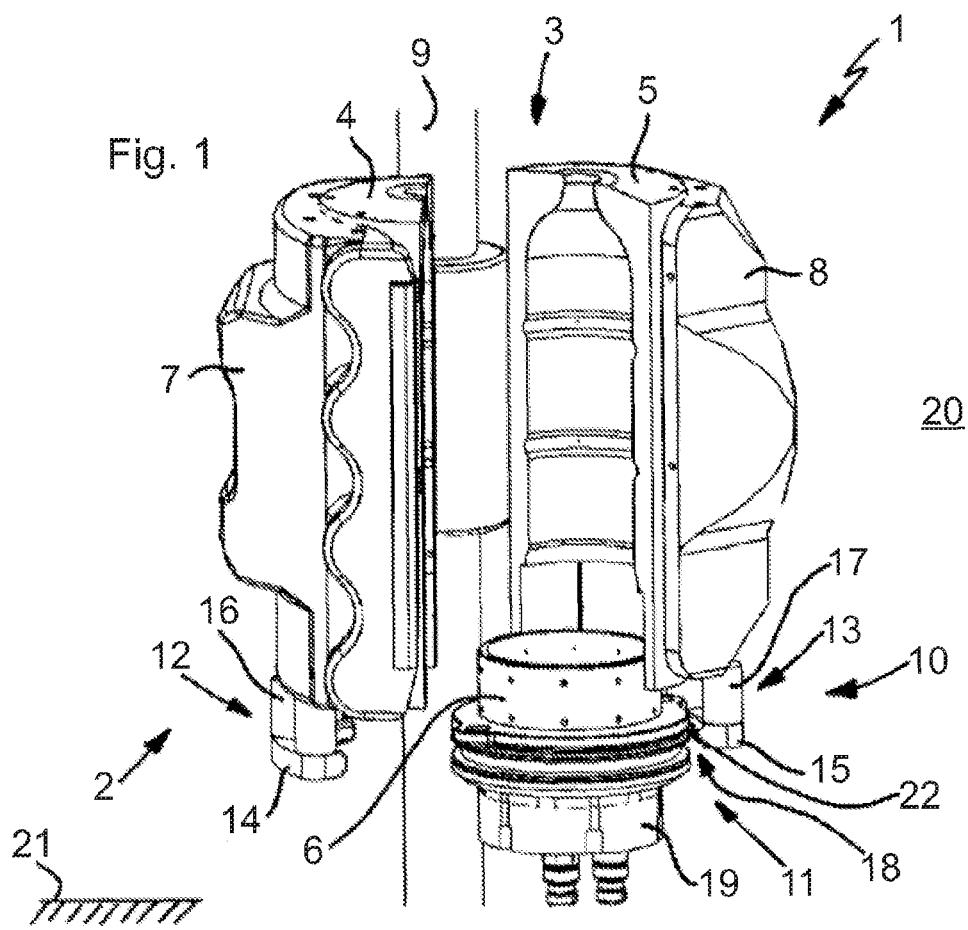

The apparatus 1 shown in FIG. 1 for the stretch blow molding of plastics material pre-forms (not shown here) into plastics material containers (likewise not shown here) comprises a carrying device 2 for carrying a blow mold 3 essentially comprising a first lateral shell part 4, a second lateral shell part 5 and a base part 6, the two shell parts 4 and 5 and the base part 6 being responsible for the shaping of the respective plastics material container.

The carrying device 2 is divided into two and has a first carrying device half 7 for carrying the first lateral shell part 4 and a second carrying device half 8 for carrying the second lateral shell part 5. The two carrying device halves 7 and 8 are mounted on a carrying rod 9 so as to be pivotable with respect to each other in this case, so that the two lateral shell parts 4 and 5 are capable of being opened and closed respectively by them in a known manner.

A base part clamping device 10 essentially comprising a base part receiving means 11, a first holding device 12 and a second holding device 13 are fastened in a releasable manner to the underside of the carrying device 2, in which case the base part receiving means 11 and thus also the base part 6 can be held and clamped in particular with respect to the two shell parts 4 and 5 by means of the two holding devices 12 and 13.

In this case the two holding devices 12 and 13 comprise holding shells or half shells 14 and 15, the first half shell 14 being flange-mounted on the first carrying device half 7 by means of a flange fastening 16 and the second half shell 15 being flange-mounted on the second carrying device half 8 by means of a further flange fastening 17.

In this way, in particular, the holding shells or half shells 14 and 15, and generally also the base part receiving means 11, can advantageously be retained on the apparatus 1 in the event of a change of the fittings for example with respect to the blow mold 3.

In order that the base part receiving means 11 can be clamped in an operatively reliable manner by the two half shells 14 and 15 in such a way that the base part receiving means 11 and/or the base part 6 of the blow mold 3 can neither be deformed in a critical manner nor be raised off from the two shell parts 4 and 5 of the blow mold in a critical manner on account of a pressing force inside the blow mold 3, during the operation of the blow mold 3 the base part receiving means 11 is clamped in a positively locking manner with the two half shells 14 and 15 by means of a fastening with positive locking 18. In order to temper the blow mold 3, a corresponding socket 19 for a tempering medium, in particular a cooling medium, is provided on the underside of the base part receiving means 11. In addition, the apparatus has a blow molding nozzle (not shown) for the expansion of the plastics material pre-forms.

Since the stretch blow molding apparatus 1 shown here is advantageously positioned in a clean room 20 of a plant 21 for stretch blow molding (not shown explicitly here), in order to meet hygienic requirements for example during the stretch blow molding of the plastics material pre-forms in the clean room 20, lubricants (not shown here) should be dispensed with, in particular also on the fastening with positive locking 18.

According to the invention the present fastening with positive locking 18 is provided with positive locking areas 22 made from ceramic material (see in particular FIG. 2) as a lubricant replacement. Areas made from ceramic material which rub against one another can also slide over one another in a trouble-free manner even without additional lubricant. In addition, these positive locking areas 22 made from ceramic material have satisfactory hardness properties and are also suitably wear-resistant in this respect.

In this case the components structurally responsible for the fastening with positive locking 18 can be either covered or coated with a ceramic material.

Figure 2:
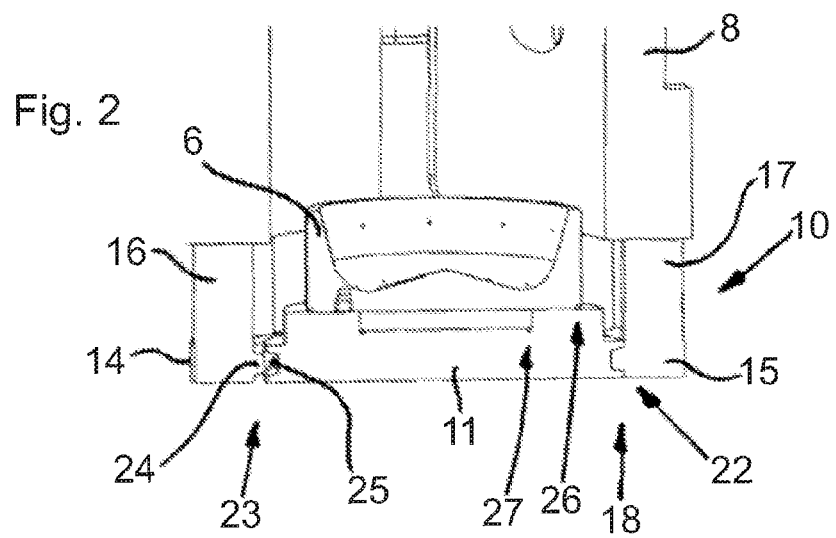
FIG. 2 is a first detailed diagrammatic view of the base part clamping device.
Figure 3:
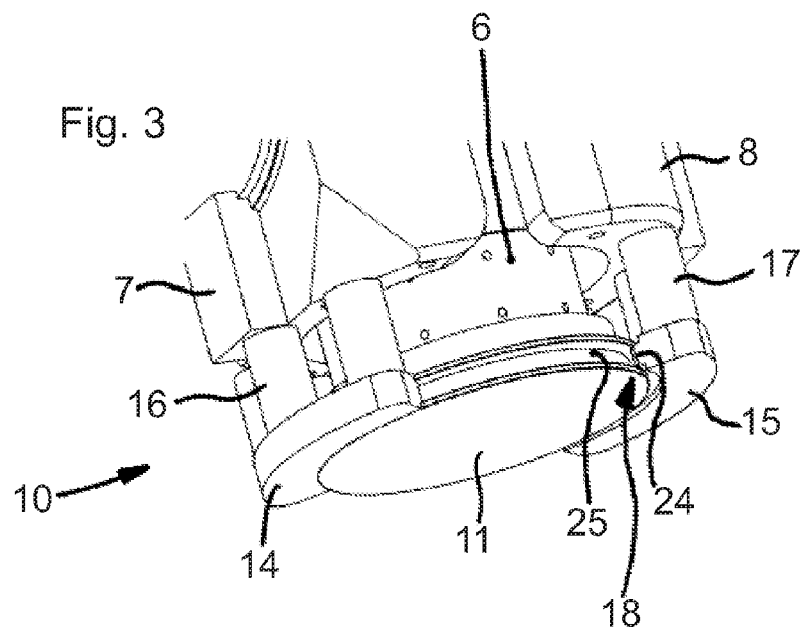
FIG. 3 is a further detailed diagrammatic view of the base part clamping device.

Alternatively, they are designed in the form of solid ceramic components, as is the case with the half shells 14, 15 which are shown in FIGS. 1 to 3 and which are produced completely from a ceramic material.

The fastening with positive locking 18 shown in greater detail in FIGS. 2 and 3 is characterized by a spring-and-groove device 23 which is designed in a structurally simple manner and which according to this first embodiment has a spring 24 towards the holding shell and a groove 25 towards the base part receiving means.

In this case the two half shells 14 and 15 are designed in the form of solid ceramic components. On account of the fact that the half shells 14, 15 are flange-mounted in a releasable manner on the respective carrying device half 7 and 8 respectively, even existing stretch blow molding apparatus 1 can be retrofitted in an advantageous manner.

In this embodiment the base part receiving means 11 is produced in an advantageous manner from steel, so that the base part receiving means 11 can also be of a conventional nature.

It is clearly evident that the base part 6 of the blow mold 3 is fastened to the base part receiving means 11, in which case a first O-ring seal 26 and a second O-ring seal 27 situated further inside radially are arranged on the underside of the base part 6 in order to be able to prevent or seal off undesired gaps on the contact faces. As a result, a hygiene risk can advantageously be further reduced. In this case it is possible for the base part receiving means 11 and/or the base part 6 to be able to be provided with corresponding O-ring receiving grooves (not numbered explicitly here) on the two O-ring seals 26 and 27 for the better positioning thereof.

Figure 4:
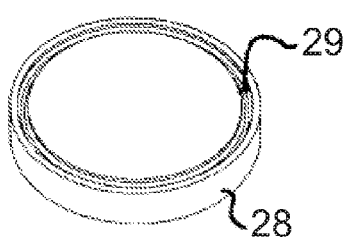
FIG. 4 shows diagrammatically an embodiment of a circular base part receiving means.

The circular ceramic base part receiving means 28 shown in FIG. 4 is characterized by a circular O-ring receiving groove 29 at the top, into which an O-ring seal 26 or 27 is capable of being inserted. This circular base part receiving means 28 is capable of being designed in the form of a rotating part in a very simple and inexpensive manner.

Figure 5:
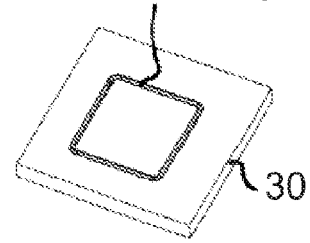
FIG. 5 shows diagrammatically an embodiment of a rectangular base part receiving means.

The alternative substantially rectangular ceramic base part receiving means 30 shown in FIG. 5 is characterized by a square O-ring receiving means 31 at the top, into which an O-ring seal 26 or 27 respectively is likewise capable of being inserted. The rectangular base part receiving means 30, however, has to be produced as a rule in a relatively complicated manner as a milled part.

Figure 6:
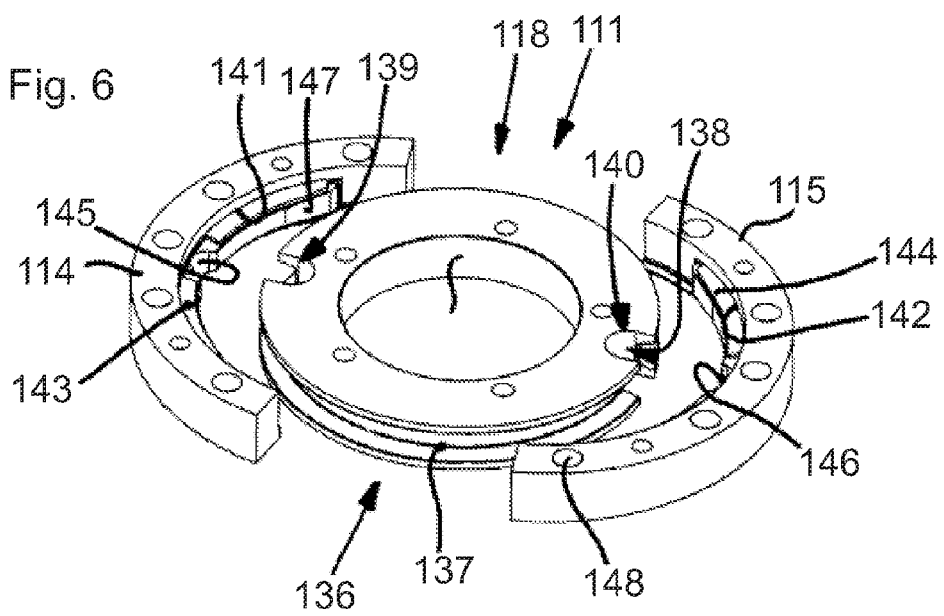
FIG. 6 is a diagrammatic view of components of an alternative base part clamping device.

In the particularly advantageous embodiment shown in FIG. 6 an alternative base part receiving means 111 for the existing stretch blow molding apparatus 1 is present as a central ring 135 and alternative half shells 114 and 115 for the existing stretch blow molding apparatus 1 are present in each case in a steel design.

In this case on one side the base part receiving means 111 has radially on the outside an undercutting 136 with a first outer groove 137 and a second outer groove 138, the two outer grooves 137, 138 being arranged separated from each other by recesses 139 and 140 in the material, as viewed in the peripheral direction of the base part receiving means 111. The recesses 139 and 140 in the material extend in the form of notches extending axially through the base part receiving means 111 through the latter on the one hand and extend radially further towards the inside than the undercutting 136 on the other hand.

On the other side the half shells 114 and 115 have in each case an inner groove 141 and 142, the openings of the outer grooves 137 and 138 and those of the inner grooves 141 and 142 being situated opposite one another in the proper operating state of the stretch blow molding apparatus 1, so that the base part receiving means 111 and the two half shells 114 and 115 are connected to one another by means of sliding blocks 143 and 144 in a positively locking manner. In this case the sliding blocks 143, 144 engage both in the respective outer groove 137 and 138 associated with them and in the respective inner groove 141 and 142 associated with them.

In the embodiment as shown in FIG. 6 the sliding blocks 143 and 144 are produced in each case from a ceramic material, as a result of which an advantageous fastening with positive locking 118 is formed between the components involved.

In this case it is possible for the base part receiving means 111 and/or the two half shells 114 and 115 likewise to be able to consist of a ceramic material if this is advantageous in certain embodiment variants.

In the region of the recesses 139 and 140 in the material the sliding blocks 143 and 144 have recesses 145 and 146 corresponding thereto, so that the sliding blocks 143, 144 and the base part receiving means 111 are prevented from rotating with respect to one another.

In this case it is immaterial whether the sliding blocks 143 and 144 are fixed as a releasable insert part 147 (numbered here only by way of example) in the outer grooves 137 and 138 or in the inner grooves 141 and 142.

For fixing purposes the sliding blocks 143 and 144 are screwed to the respective half shell 114 and 115 by means of screw fastenings (not shown explicitly here). To this end screw receiving holes 148 (numbered only by way of example) are provided in each case on the half shells 114 and 115, these screw receiving holes 148 also being used for fastening the half shells 114 and 115 to the carrying device halves 7 and 8 respectively associated with them in each case.

It is to be understood that the embodiments explained above are only a first design of the stretch blow molding apparatus according to the invention.

In this respect the design of the invention is not restricted only to these embodiments.

The Applicants reserve the right to claim individual features or all the features disclosed in the application documents as being essential to the invention, insofar as they are novel either individually or in combination as compared with the prior art.

LIST OF REFERENCES 1 apparatus for the stretch blow molding
2 carrying device
3 blow mold
4 first lateral shell part
5 second lateral shell part
6 base part
7 first carrying device half
8 second carrying device half
9 carrying rod
10 base part clamping device
11 base part receiving means
12 first holding device
13 second holding device
14 first half shell/holding shell
15 second half shell/holding shell
16 flange fastening
17 further flange fastening
18 fastening with positive locking
19 socket for tempering medium
20 clean room
21 plant for the stretch blow molding
22 ceramic positive locking areas
23 spring-and-groove device
24 spring
25 groove
26 first O-ring seal
27 second O-ring seal
28 circular ceramic base part receiving means
29 circular O-ring receiving means
30 rectangular ceramic base part receiving means
31 square O-ring receiving means
111 alternative base part receiving means
114 first alternative half shell
115 second alternative half shell
118 fastening with positive locking
135 central ring
136 undercutting
137 first outer groove
138 second outer groove
139 first recess in the material
140 second recess in the material
141 first inner groove
142 second inner groove
143 first sliding block
144 second sliding block
145 first recess
146 second recess
147 releasable insert part
148 screw receiving holes

The invention claimed is:

1. An apparatus (1) for the shaping of plastics material pre-forms to form plastics material containers with a carrying device (2) for carrying a blow mold (3) comprising at least two shell parts (4, 5) and a base part (6) and with a base part clamping device (10) comprising a base part receiving means (11; 28; 30; 111) and holding devices (12, 13 and 14, 15; 114, 115 respectively) for holding the base part receiving means (11; 111), in which the base part receiving means (11; 28; 30; 111) is capable of being clamped to the holding devices (12, 13 and 14, 15; 114, 115 respectively) by way of a fastening with positive locking (18; 118), wherein the fastening with positive locking (18; 118) has positive locking areas (22) produced from ceramic material.

2. The apparatus (1) according to claim 1, wherein the base part receiving means (11; 28; 30;) and/or the holding devices (12, 13 and 14, 15 respectively) are formed completely from ceramic material.

3. The apparatus (1) according to claim 1, wherein both the base part receiving means (111, 135) and the holding devices (114, 115) have in each case at least one groove (137, 138; 141, 142), which grooves correspond to one another by means of at least one sliding block (143, 144) in such a way that the base part receiving means (111, 135) and the holding devices (114, 115) are connected to one another in a positively locking manner, wherein the at least one sliding block (143, 144) is produced from a material which is different from the material of the base part receiving means (111, 135) and the holding devices (114, 115).

4. The apparatus (1) according to claim 1, wherein the base part receiving means (111, 135) is provided radially on the outside with an undercutting (136) with at least two grooves (136, 137), wherein the grooves (136, 137) of the base part receiving means (135) are arranged separately from each other in the peripheral direction by recesses (139, 140) in the material which extend radially further towards the inside than the undercutting (136).

5. The apparatus (1) according to claim 1, wherein the base part receiving means (11; 28; 30; 111, 135) is sealed off from the base part (6) by means of at least one O-ring seal (26, 27).

6. The apparatus (1) according to claim 1, wherein the stretch blow molding apparatus (1) is arranged in a clean room (20) of a plant (21) for the stretch blow molding of plastics material pre-forms.

7. The apparatus (1) according claim 1, wherein the fastening with positive locking (18) comprises a spring-and-groove fastening (23) in which a spring (24) and/or a groove (25) of the base part clamping device (10) are formed at least in part from a ceramic material.

8. The apparatus (1) according to claim 1, wherein a spring (24; 143, 144) and/or a groove (25) of the base part clamping device (10) has or have at least one ceramic base body which is mounted in a replaceable manner as a releasable insert part (147) on the base part clamping device (10).

9. A plant (21) for the stretch blow molding of plastics material pre-forms into plastics material containers with a clean room (20) and with at least one blow molding station comprising a blow mold (3) for shaping the plastics material pre-forms, wherein the stretch blow molding plant (21) has a stretch blow molding apparatus (1) according to claim 1.

10. The apparatus (1) according to claim 3, wherein the at least one sliding block (143, 144) is produced from a ceramic material.

11. The apparatus (1) according to claim 1, wherein the positive locking areas or the respective components are arranged in an interchangeable manner directly or indirectly on the carrying device for carrying the blow mould.

12. The apparatus (1) according to claim 11, wherein the positive locking areas or the respective components are arranged by way of suitable flange fastenings directly or indirectly on the carrying device for carrying the blow mould.

13. The apparatus (1) according to claim 7, wherein the spring and the groove consist at least in part of a ceramic material.

14. The apparatus (1) according to claim 13, wherein the region of sliding faces consist of a ceramic material.

15. A method for the shaping of plastics material pre-forms to form plastics material containers in a stretch blow molding apparatus (1) comprising:

- inserting a plastics material pre-form into a stretch blow molding apparatus (1), said stretch blow molding apparatus comprising at least two shell parts (4, 5) and a base part receiving means (11; 28; 30; 111);
- clamping a holding device (12, 13 and 14, 15; 114, 115 respectively) connected to the at least two shell parts (4, 5) to the base part receiving means (11; 28; 30; 111) by way of a fastening with positive locking (18; 118);
- expanding the plastics material pre-form by means of a process pressure to form a plastics material container;
- separating the holding device (12, 13 and 14, 15; 114, 115 respectively) and shell parts (4, 5) from the base part receiving means ((11; 28; 30; 111);
- removing the plastics material container; and
- wherein the stretch blow molding apparatus (1) is in a clean room (20);
- wherein the fastening with positive locking (18; 118) has positive locking areas (22) produced from ceramic material.

* * * * *